United States Patent [19]

Pao et al.

[11] Patent Number: 4,979,126
[45] Date of Patent: Dec. 18, 1990

[54] NEURAL NETWORK WITH NON-LINEAR TRANSFORMATIONS

[75] Inventors: Yoh-Han Pao; Farrokh Khatibi, both of Cleveland Heights, Ohio

[73] Assignee: AI Ware Incorporated, Cleveland, Ohio

[21] Appl. No.: 175,184

[22] Filed: Mar. 30, 1988

[51] Int. Cl.⁵ .............................................. G06F 15/18
[52] U.S. Cl. .................................................... 364/513
[58] Field of Search .................. 382/14, 15; 364/200, 364/900, 300, 513

Primary Examiner—Allen MacDonald
Attorney, Agent, or Firm—Fay, Sharpe, Beall, Fagan, Minnich & McKee

[57] ABSTRACT

A neural network system includes means for accomplishing artificial intelligence functions in three formerly divergent implementations. These functions include: supervised learning, unsupervised learning, and associative memory storage and retrieval. The subject neural network is created by addition of a non-linear layer to a more standard neural network architecture. The non-linear layer functions to expand a functional input space to a signal set including orthonormal elements, when the input signal is visualized as a vector representation. An input signal is selectively passed to a non-linear transform circuit, which outputs a transform signal therefrom. Both the input signal and the transform signal are placed in communication with a first layer of a plurality of processing nodes. An improved hardware implementation of the subject system includes a highly parallel, hybrid analog/digital circuitry. Included therein is a digitally addressed, random access memory means for storage and retrieval of an analog signal.

15 Claims, 11 Drawing Sheets

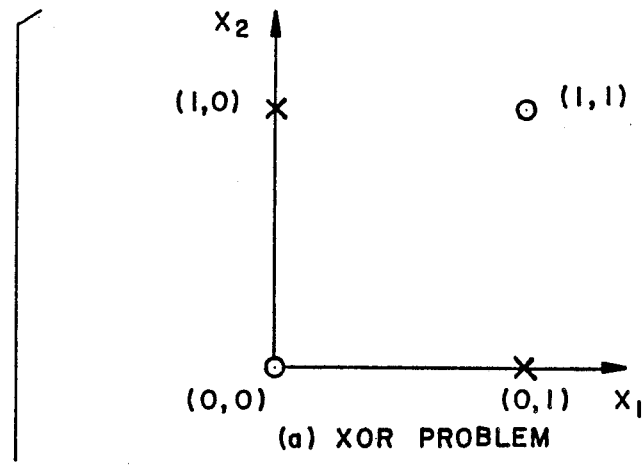
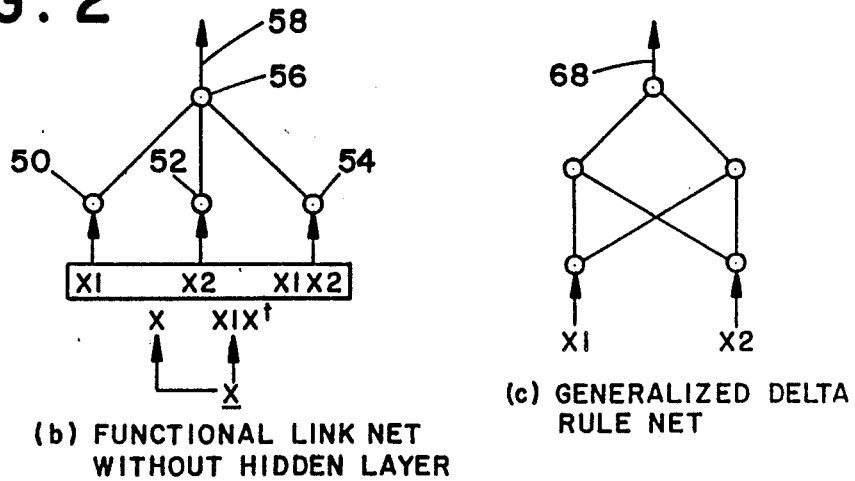
FIG. 2
(a) XOR PROBLEM
(b) FUNCTIONAL LINK NET WITHOUT HIDDEN LAYER
(c) GENERALIZED DELTA RULE NET
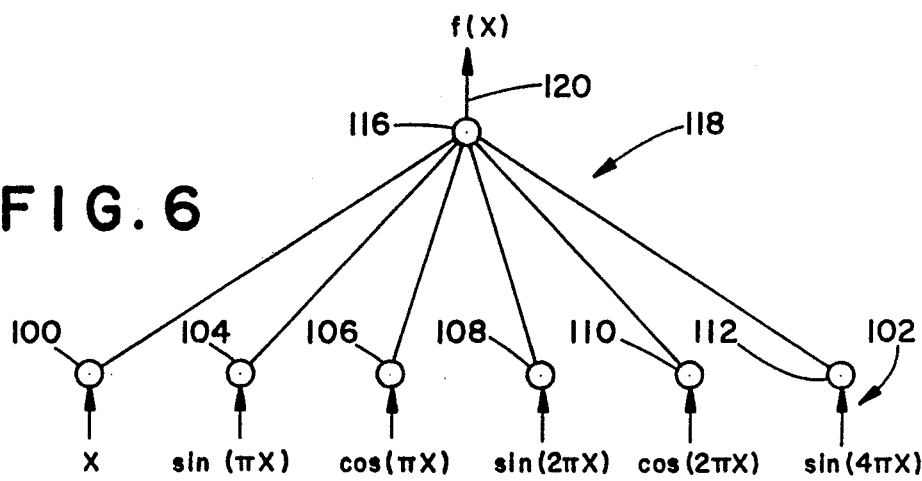
FIG. 6

(a) PARITY 3 PROBLEM (b) FUNCTIONAL LINK NET WITH NO HIDDEN LAYERS (c) GENERALIZED DELTA RULE NET

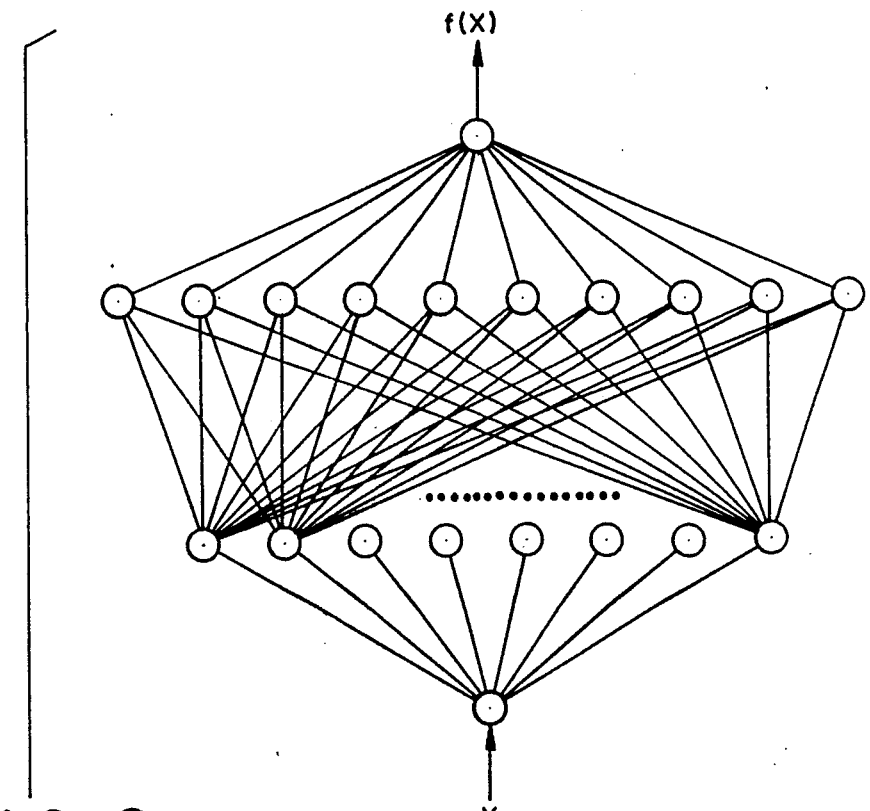
(a) GENERALIZED DELTA RULE NET
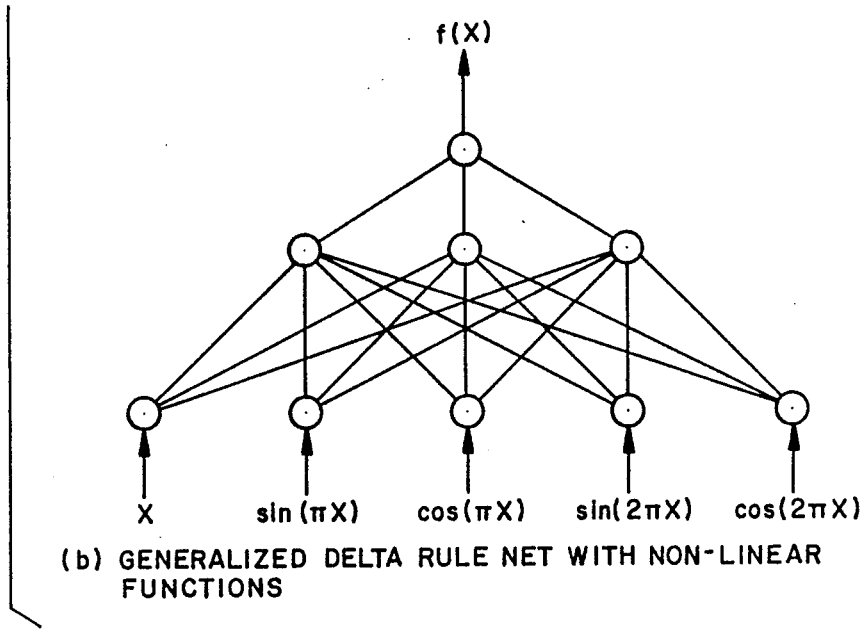
(b) GENERALIZED DELTA RULE NET WITH NON-LINEAR FUNCTIONS
FIG. 9

LEARNING ACHIEVED WITH FEEDFORWARD NET
(a) SEMILINEAR GENERALIZED DELTA RULE NET
(b) FUNCTIONAL LINK NET WITH ONE HIDDEN LAYER

NEURAL NETWORK WITH NON-LINEAR TRANSFORMATIONS

BACKGROUND OF THE INVENTION

This application pertains to the art of artificial intelligence networks and more particularly to the art of neural networks.

The invention is particularly applicable to pattern recognition systems and will be described with particular reference thereto, although it will be appreciated that the invention has broader application.

During the last five years, there have been significant new developments in the technology for processing of pattern formatted information.

Depending on the original intent of the development and the discipline of the researchers, these new developments are often referred to as parallel distributed processing, neural-nets or connectionist-nets. There are no sharp dividing lines and one common aspect of all such developments is interest in the structure and capabilities of networks of rather simple processors connected in manners reminiscent of human biological neural nets.

New developments were originally in the form of a few new algorithms and some promising demonstrations of the capabilities of this new approach towards processing pattern information.

Three algorithms are particularly important in that they have focused interest on three important and seemingly different task areas, these being:
(1) supervised learning of associated input/output pairs and subsequent recognition of further unassociated inputs,
(2) unsupervised learning or clustering of a body of unlabeled input patterns on the basis of some metric (concept discovery), and finally
(3) associative storage and retrieval of the original patterns or associated patterns, even if the recall cue is only a distorted version of one of the originally stored patterns.

A development by Rumelhart, Hinton, and Williams referred to as a feedforward semi-linear net based on back-propagation of error, is a prime example of algorithms which fall into the first category. In such a net, a series of processing nodes are non-linear, and links therebetween are linear. The nodes are arranged in a series of layers. A progression of nodes from lower layers to upper layers is implemented. An output from a node is multiplied by a weight, and fed forward to a summing junction at an input of a node at a subsequent upper layer. Each lower layer node is generally connected to all the nodes at the next higher layer.

Learning in such nets is accomplished by adjustment of the weights until a single set of weights is capable of transforming each and all of the training set input patterns into the appropriate associated output pattern. The net then has then "learned" the classifications and is desirably capable of classifying all other patterns in the domain of the training set. The procedure for adjusting the weights is also called the Generalized Delta Rule.

This type of net is useful under appropriate conditions. One limitation is that it is adequate only for input patterns with a small number of components. Otherwise learning is extremely slow, and sometimes convergence towards small system errors is simply not obtained. Increasing the number of nodes in the "hidden" layers or increasing the number of layers helps only to a point, after which performance deteriorates further. A type of "noise," hinders learning in such systems.

A higher order connectionist-net, based on a more complicated network structure and a more complex algorithm (the MetaGeneralized Delta Rule), has been demonstrated to result in higher learning rates.

Unsupervised learning algorithms are associated with the names of Grossberg and Carpenter, Kohonen, and Amari, although non-neural net algorithms such as ISODATA have been known for a long time and are used widely.

The Adaptive Resonance Theory (ART) networks of Grossberg and Carpenter are perhaps best viewed as aspects, and only aspects, of more generalized theories regarding human behavior. Insofar as its network algorithmic aspects are concerned, the idea is to organize a set of input patterns in accordance with how a pattern fits or does not fit a leader or prototype. However, as a pattern becomes accepted in a cluster, it in turn modifies the concept of that "prototype" somewhat. Two different versions of such nets exist. They are called ART 1 and ART 2 and are appropriate for discrete binary and continuous valued inputs respectively. This organizational step is important in any pattern information processing. It is interesting and important to note that the nets used in ART 1 and ART 2 and indeed in Kohonen's work are "flat" in the sense that there are no "hidden" layers. Such ART networks are often attributed to be susceptible to noise.

Another model, referred to as the Hopfield net is of limited practical use. The efficiency of storage is small, and at any storage level the incidence of errors may be high depending on the nature of the distortion in the input pattern. Some of the error characteristics can be helped through simulated "annealing" and limitations to storage capacity can be alleviated through use of "higher order" links, though at the cost of substantially increased computing burdens. In addition, the original Hopfield net is only auto-associative in the sense that a distorted pattern can only retrieve a corrected version of itself, but cannot retrieve another dissimilar pattern with which it had been "associated" during storage. This is a severe functional limitation. Tank and Hopfield, Kleinfeld, and others have attempted to deal with this associating a set of (Tij) links with any specific set of (tij) links so that onset of a specific cue pattern X'. causes the system to recognize it correctly as X and also to trigger an evolution of the net to X, an hetero-associated pattern.

Most of the present day neural net computing is being achieved with simulated parallel processing. The three above-noted types of algorithms and net implementations are, however, quite far apart.

However, significant pattern information processing tasks generally involve all three types of processing. Sets of complex patterns need to be stored in associated manners suitable for retrieval through cues; concepts for the basis of learning and information storage need to be learned (even inferred) through unsupervised self-organizing procedures; and finally "meaning" has to be given to the organized clusters and to the established associations through supervised learning.

The present invention contemplates a new and improved system of neural networks which overcomes all of the above-referred problems, and others, and provides a unified system for accomplishing neural networks which have heretofore been accomplished by independent, incompatible systems.

This invention may take physical form in certain parts and arrangements of parts, preferred embodiments of which will be described in detail in this specification and illustrated in the accompanying drawings which form a part hereof and wherein:

FIG. 1 is a diagram illustrating the functional link neural network of the present invention;

FIGS. 2(a)–2(c) illustrate another example of a learning function implemented in conventional and functional link neural network;

FIG. 3 illustrates the improved learning rate of the subject system in the example of FIG. 2 over prior neural network architectures;

FIGS. 4(a)–4(c) illustrate another example of a learning function implemented in conventional and functional link neural network;

FIG. 6 illustrate a delta rule net with a functional link net and no hidden layer illustrate another example of a learning function implemented in conventional and functional link neural networks;

FIG. 9 illustrates a comparison of system configurations of nets used to learn a function;

SUMMARY OF THE INVENTION

Figure 1:
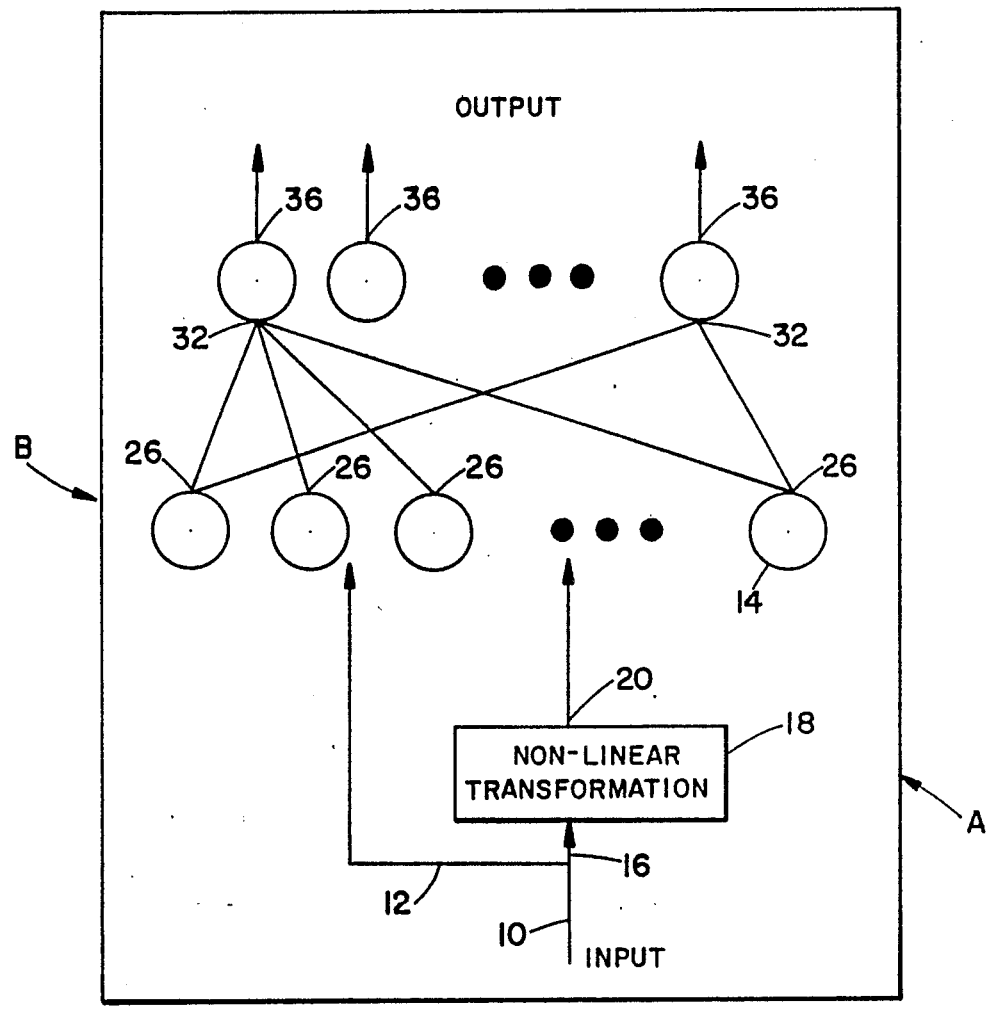

In accordance with the present invention, there is provided neural network system which includes a plurality of processing nodes arranged into at least first and second layers. A apparatus or means is provided for receiving an input signal comprising data representative of an input pattern. At least a portion of the input signal is communicated to all or some of the processing nodes of the first layer. A transformation apparatus or means is provided for performing a non-linear transform on a signal input thereto to form a transform signal as an output thereof. A second communication apparatus or means communicates at least a portion of the input pattern to the transformation apparatus or means. A third communication apparatus or means communicates the transform signal resultant from operation of the transform apparatus or means to at least a first portion of the processing nodes of the first layer. A fourth communication apparatus or means communicates the output of processing nodes of the first portion and the second portion of the first layer to at least a third portion of the processing nodes of the second layer. An apparatus or means for outputting the output signal from the processing nodes of the second layer is then provided.

In accordance with a more limited aspect of the present invention, the first communication apparatus or means includes apparatus or means for communicating all portions of input signal to the transformation apparatus or means.

In accordance with a more limited aspect of the present invention, the input pattern data is representative of vector data, and the transformation apparatus or means includes apparatus or means for performing vector operations on the input data.

In accordance with a more limited aspect of the present invention, the apparatus for performing vector operations includes apparatus or means for calculating an outer product of data representative of an input pattern.

In accordance with a another more limited aspect of the present invention, an apparatus or means is provided for selectively pruning outputs of the transform apparatus.

In accordance with a yet more limited aspect of the present invention apparatus or means are provided for receiving data representative of a training set pattern, for evaluating joint activations of nodes over a training set pattern, and controlling the pruning apparatus in accordance with an output of the evaluating apparatus.

In accordance with another aspect of the present invention, a method in accordance with the functionality of the above apparatus is provided.

An advantage of the present system is the provision of a neural network architecture which accomplishes functions which have heretofore been accomplished by divergent, non-interchangeable architectures.

Another advantage of the present system is the provision of a neural network architecture with improved accuracy and flexibility.

Yet another advantage of the present system is the provision of a neural network with increased freedom from interference from external noise sources.

Further advantages will become apparent to one of ordinary skill in the art upon a reading and understanding of the following detailed description.

DETAILED DESCRIPTION OF THE PREFERRED EMBODIMENTS

Referring now to the drawings wherein the illustrations are for the purposes of illustrating the preferred embodiments of the invention only, and not for the purpose of limiting the same, FIG. 1 illustrates the basic architecture of the functional link net of the preferred embodiment.

A neural network A includes a plurality of processing nodes B. The processing nodes B are typical of those implemented in neural networks, as will be appreciated by one of ordinary skill in the art. Such nodes are suitably modeled in software for implementation of a standard digital computers, or are alternatively fabricated of discrete components, such as dedicated hardware processors fabricated from VLSI technology.

An input apparatus or means 10 is adapted for receiving an input signal comprising data representative of an input pattern. A first communication path or means 12 communicates at least a portion of the input signal to at least a portion of a first layer 14 of the processing nodes A. A second communication path or means 16 communicates at least a portion of the input pattern to a transformation apparatus or means 18. As with the processing nodes B, the transformation apparatus may be suitably modeled in software or implemented in dedicated hardware.

The transformation apparatus 18 functions to perform a non-linear transformation on the input signal, thus forming a transform signal on an output 20 thereof. As input pattern data is often considered as a vector, such a non-linear transform may include such an operation as a vector outer product. This non-linear transform functions to expand the input vector space to include elements orthogonal to one another. A third communication path or means 22 selectively communicates a the transform signal to at least a second portion of the first layer of nodes 14.

Outputs 26 of nodes of the first layer 14 are communicated, via a fourth communication network path or means 28, to inputs 32 to preferably each of a second layer 34 of processing nodes B.

Outputs 36 of the nodes 34 suitably perform as a system output of the neural network A. Alternatively, any n number of additional layers may be implemented as a subsequent layer, analogously to the interconnections between processing nodes of the first layer 14 and the second layer 34.

In this system, various interconnections between nodes are assigned "weights" depending on such factors as frequency of usage and relative interconnection.

In the Rumelhart-Hinton-Williams net, an attempt at attaining greater learning capacity is made by increasing the number of nodes in a layer or by increasing the number of layers. In the MetaGeneralized Delta Rule net (Meta-GRD) proposed by Pomelreau, a learning rate is increased by increasing the complexity of the connections and by formulating more complex rules for updating the weights. In the Meta-GDR net links modify other links. In both cases, the net architecture is made more complex an dissimilar to the nets used for unsupervised learning and for associative storage and retrieval.

In the non-linear functional link net, the step responsible for enhancing learning capacity is kept separate from the actual learning procedure. The latter is dramatically simplified.

The key step in formulation of a non-linear functional link is application of a non-linear functional link transform of the input pattern. This step increases the amount of pattern information made explicitly available to the net.

In the non-linear function link net, the non-linear transformation is not made by a node, but along a link. The transform is not solely on components individually, but rather on the input pattern as a whole. This is followed by a pruning operation which discards all components which do not help to make more information explicitly available. This pruning is a important aspect of the formation of this net.

Because of the pruning, it may appear that individual components of the input pattern were arbitrarily raised to various integer powers and arbitrary combinations of products of other components were also added. However that ad hoc procedure would be impracticable. The effective procedure is to carry out nonlinear transforms on the input vector, transforming it to tensors of as high an order as appropriate or necessary. Pruning removes irrelevant components. Very often only one stage of transform is necessary and the transformation is readily understood in terms of formation of an outer product of the input pattern vector, e.g.

$$x \rightarrow xx^t$$

In component form, we can express the results of the successive transformations as $$\{xi\} \rightarrow \{xi, xi\, xj\}_{j \geq i} \{xi, xi\, xj, xi\, xj\, xk\}_{\substack{j \geq i \\ k \geq j,i}} \text{ and so on}$$

Pruning is desirable given that without it there would be exponential growth in the dimension of the resulting pattern. The number of components of the transformed vector are listed in the following for various input vector dimensions and various stages of transformation:

| | | $\{xi, xi\, xj, xi\, xjxk\}$ | |
|---|---|---|---|
| | $\{xi, xi\, xj\}$ | $j \geq i$ | $j \geq i$ |
| $\{xi\}$ | $j \geq i$ | $k \geq j, i$ | |
| 3 | 9 (6) | (7) | |
| 4 | 14 (10) | (14) | |
| 5 | 20 (15) | (25) | |
| 6 | 27 (21) | (41) | |
| 7 | 35 (28) | (63) | |
| 8 | 44 (36) | (92) | |
| 10 | 65 (55) | (175) | |
| 20 | 230 (210) | (1350) | |

The numbers in parenthesis refer to patterns with the "diagonal" terms omitted generally these provide much less information than the off-diagonal terms.

The non-linear functional link yields a greatly lengthened pattern, but a "flat" net with no hidden layer. The delta rule can be used instead of the Generalized Delta Rule. Our pruning technique is as follows:

If sign of xi and xj are the same then evaluate $|xj| - |xi|$ if $> \delta$ add zero to register if $< \delta$ add 1 to register If sign of xi and xj are different then evaluate $|xj| - |xi|$ if $> \delta$ add zero to register if $< \delta$ add $-1$ to register If the value of the register is below a threshold value, it will be pruned out.

Turning now to FIG. 2, an illustration of solution of the exclusive-or Problem with a function link net architecture will be described. The desired properties of an exclusive or function are graphically illustrated in FIG. 2(a). FIG. 2(b) illustrates the exemplary arrangement implemented which incorporates the subject architecture. Therein, an input pattern is defined by x and y values which are input to nodes 50 and 52. A non-linear transform which is x multiplied by y, is created and the resultant value forms an input to node 54. The output from nodes 50, 52, and 54 each form an input to node 56. The output 58 of node 56 forms the system output for the model. FIG. 2(c) illustrates the input to a generalized delta rule net which does not include the addition of a non-linear (xy) term. The output 68 of the architecture of FIG. 2(c) may be then compared to the output 58 of FIG. 2(b).

Figure 3:
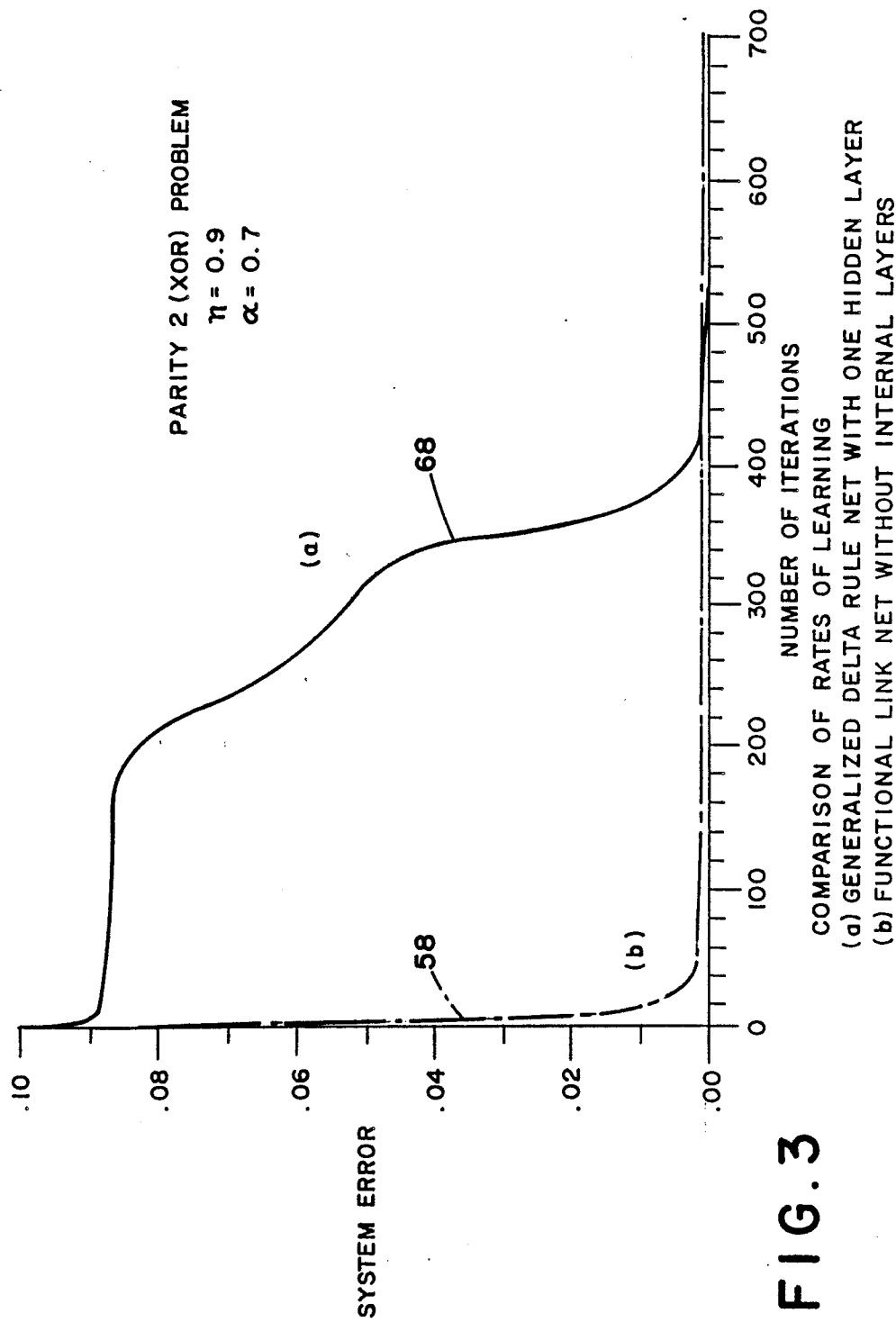

Turning to FIG. 3, a comparison of the system error versus number of iterations for the output 58 of the architecture of FIG. 2(c) are compared to the output 68 of the architecture of FIG. 2(c). It will be seen that the system error decreases substantially more rapidly by implementation of the architecture fabricated in accordance with the subject system.

In this example, the $x_1x_1$ and $x_2x_2$ terms were omitted and only the $x_1x_2$ term was retained. For even parity patterns the correlation was +1, and for odd parity patterns the correlation was −1. Either of these values form a sufficient reason for retaining the off-diagonal terms. Significantly increased learning rate was obtained as shown in figures.

Figure 4:
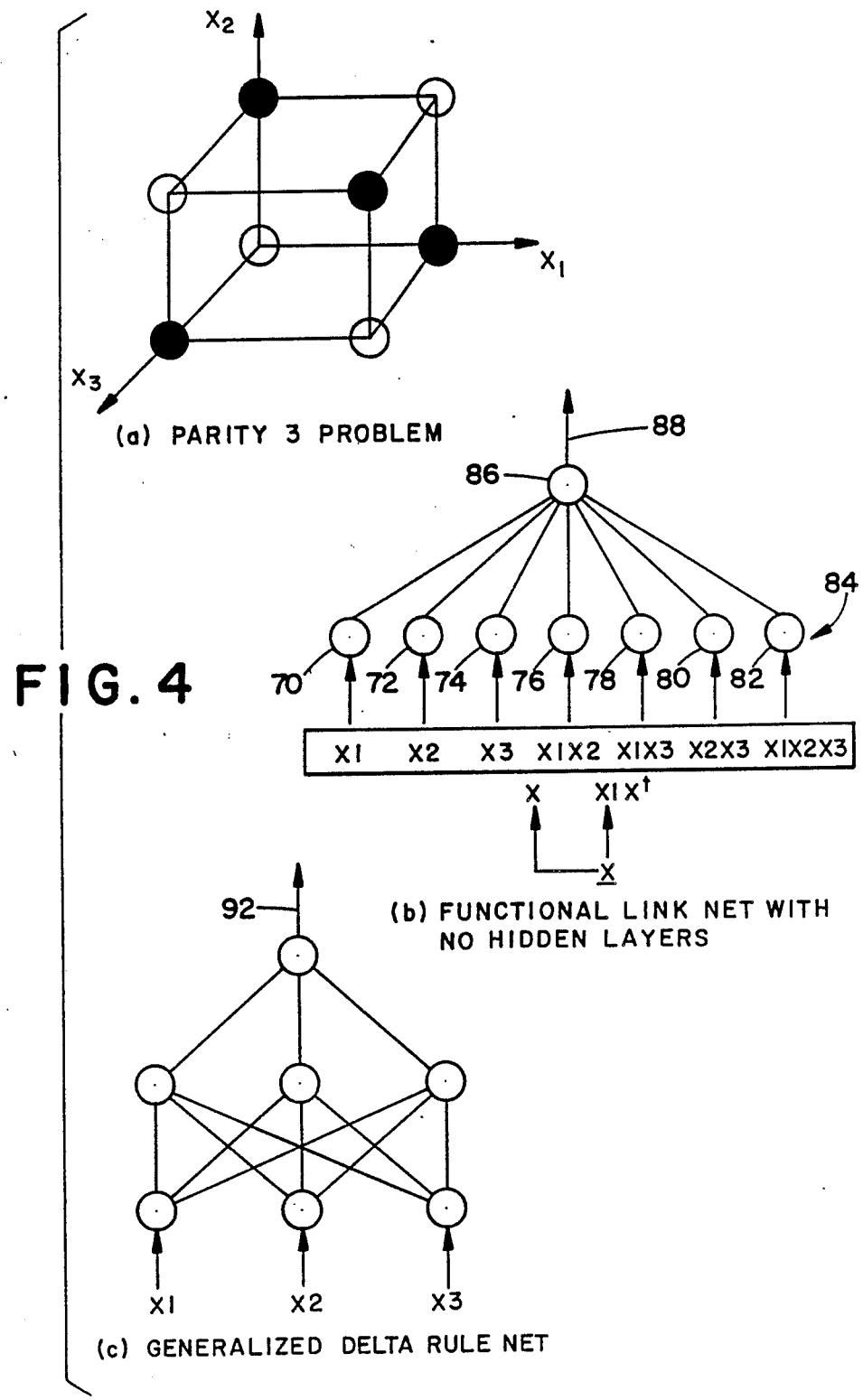

Turning now to FIG. 4, an illustration of solution of parity 3 problem with an architecture of the present system is disclosed. This example addresses the parity 3 problem using a third order functional link net as shown in the Figure.

In FIG. 4(a) the basic parity 3 problem is illustrated. FIG. 2(b) illustrates the system fabricated in conjunction with the present architecture. Inputs x, y, and z are the values from an initial input signal. These values are form inputs to nodes 70, 72, and 74 respectively. Non-linear transform functions xy, yz, zx, and xyz are input to nodes 76, 78, 80, and 82 respectively. The nodes 70, 72, 74, 76, 78, 80, and 82, together define nodes of a first layer 84. Outputs of each node of the first layer 84 are placed into a second layer, comprised of node 86. A system output 88 is formed as the output to the second layer 86. Turning to FIG. 4(c), the pattern x, y, and z, are input without benefit of the non-linear transformation to a generalized delta rule net to form system output 92.

Figure 5:
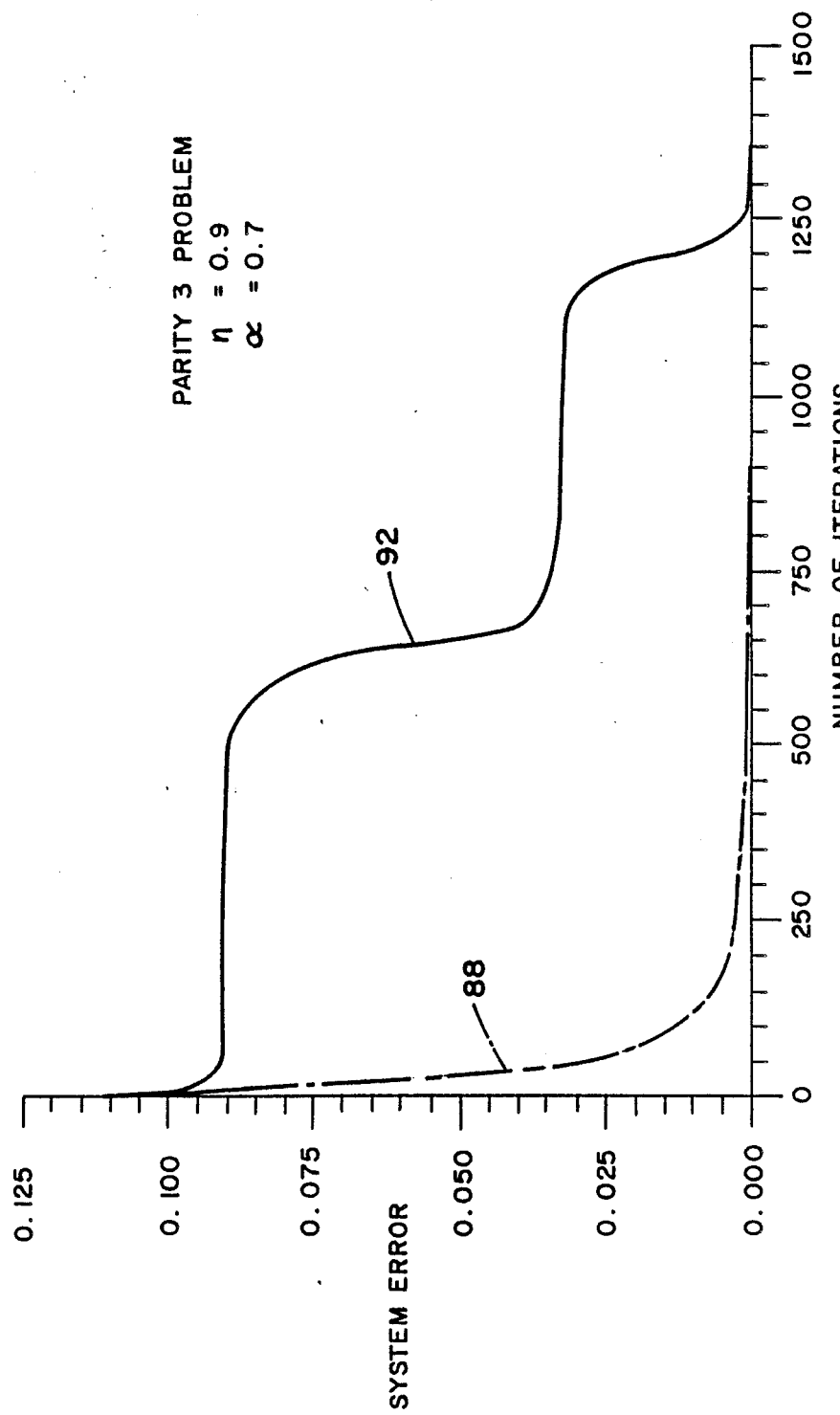
FIG. 5 illustrates the improved learning rate of the subject system in the example of FIG. 4 over prior neural network architectures.

Turning to FIG. 5, a comparison, analogous to that of FIG. 3, of the learning curves for the systems of FIGS. 4(b) and 4(c) are illustrated. Again, a significant improvement in the learning rate is illustrated by the system output 88 of the present system structure of FIG. 4(b) as compared to the system output 92 of the generalized delta rule net of FIG. 4(c).

Turning now to FIG. 6, illustrated is a learning of a function form a set of sampled readings.

In this case, the original pattern x (input to node 100 of first layer 102) has only one component. Therefore, the "diagonal" element is retained. The non-linear diagonal terms to all orders are kept. Different combinations of such terms are taken to obtain $\sin(\pi x)$, $\cos(\pi x)$, $\sin(2\pi x)$, and $\cos(2\pi x)$ after x, $\sin(\pi x)$, $\cos(\pi x)$, $\sin(2\pi x)$, and $\cos(2\pi x)$ are treated as a vector. An additional functional transform is then carried out to obtain x, $\sin(\pi x)$, $\cos(\pi x)$, $\sin(2\pi x)$, $\cos(2\pi x)$, $\sin(\pi x)\cos(\pi x)$, and $\sin(2\pi x)\cos(2\pi x)$. These terms form the inputs to nodes 104, 106, 108, 110, and 112, of first layer 102 respectively. Outputs of each of these nodes form inputs to node 16 of second layer 118. An output 120 of node 116 forms a system output.

Figure 7:
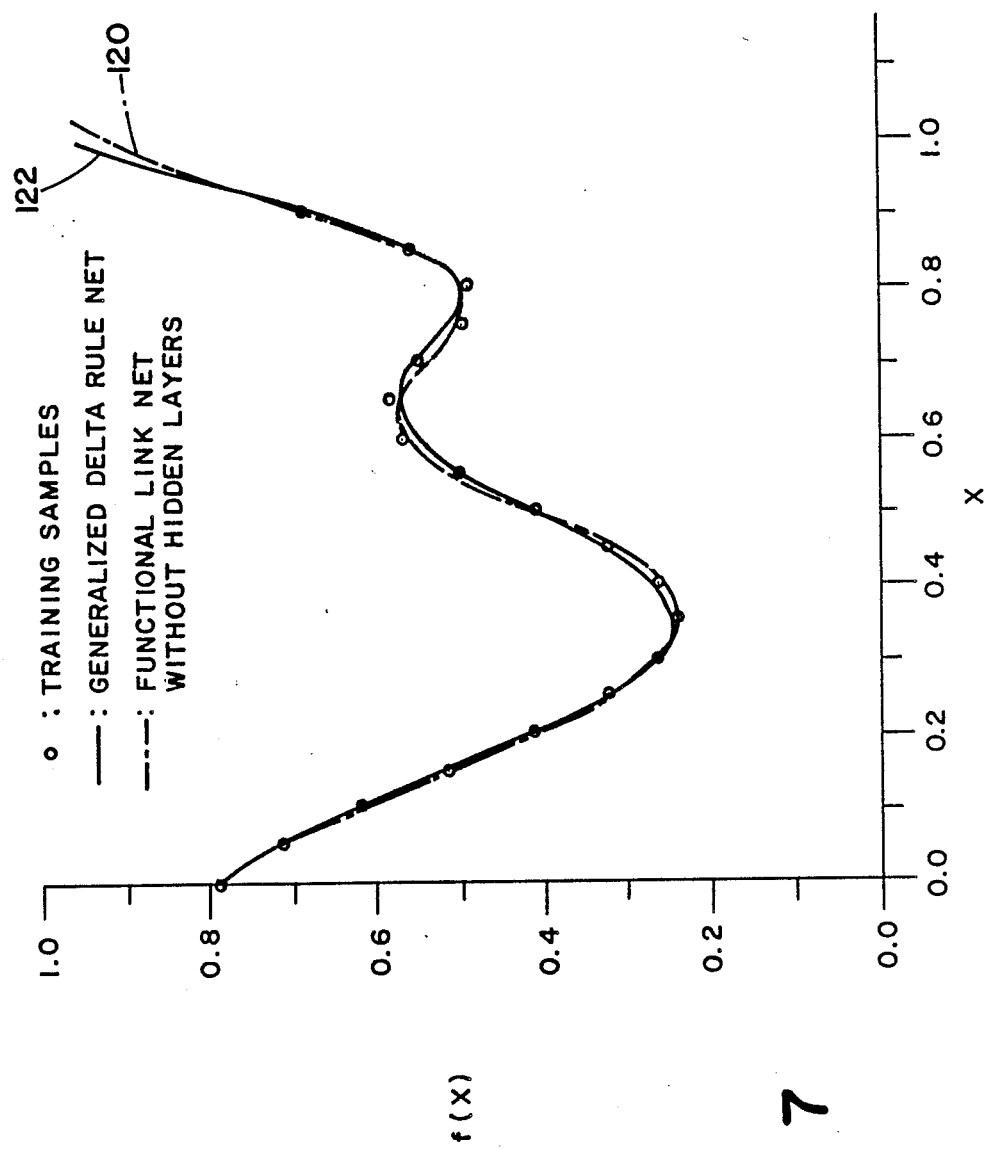
FIG. 7 and FIG. 8 illustrate the improved learning rate of the subject system in the example of FIG. 6 over prior neural network architectures.

With reference to FIG. 7, twenty samples of the function was presented to the net of FIG. 6. An estimate of the function was learned with a flat net and the resulting function is shown in the Figure by output curve 120, compared with the original twenty samples and with function learned with a conventional multi-layer Rumelhart net (curve 122). It is seen that the learning rate is much enhanced in the case of the functional link net and the accuracy with which the original function is reproduced is greater in the case of the functional link net.

The architectures for Hopfield, Grossberg and Carpenter, and Rumelhart-Hinton-Williams nets are completely different. Yet and real world task very often require all the three functionalities which these three nets provide. It is therefore desirable that a single architecture be able to support all these three functionalities. It is possible to do this with the subject system provided we flat net architecture is maintained; that is an architecture having no hidden layer.

Both unsupervised and supervised learning can be achieved with such nets. In addition, such a net can also serve as an associative memory. This is accomplished as follows: The system is first presented a set of exemplars like x1,x2,x3,...,xp with output of 1. The system is then presented a slightly distorted input x's (the output will be different than 1). The goal is to change the input values (without changing weight values) so that the output converges to 1. The process is as follows:

FORMULA 1

Calculate $$-\frac{\partial E}{\partial x_j}$$

where E is the system error and xj is the $j^{th}$ component of the input pattern.

$$\text{Take } \Delta x_j = -\frac{\eta \partial E}{m \; \partial x_j}$$

$$E = \tfrac{1}{2} \sum_k (t_k - o_k)^2$$

and $o_k = f(net_k + o_k)$
where k=threshold function for the $k^{th}$ node $$\text{and } net_k = \sum_j w_{kj} x_j$$

carry out the differentiation and substitutions, we have $x_j = \eta(t_k - o_k)(1 - o_k) o_k w_{kj}$ Correction achieved in this manner changes the distorted pattern back to the closes original input.

Figure 8:
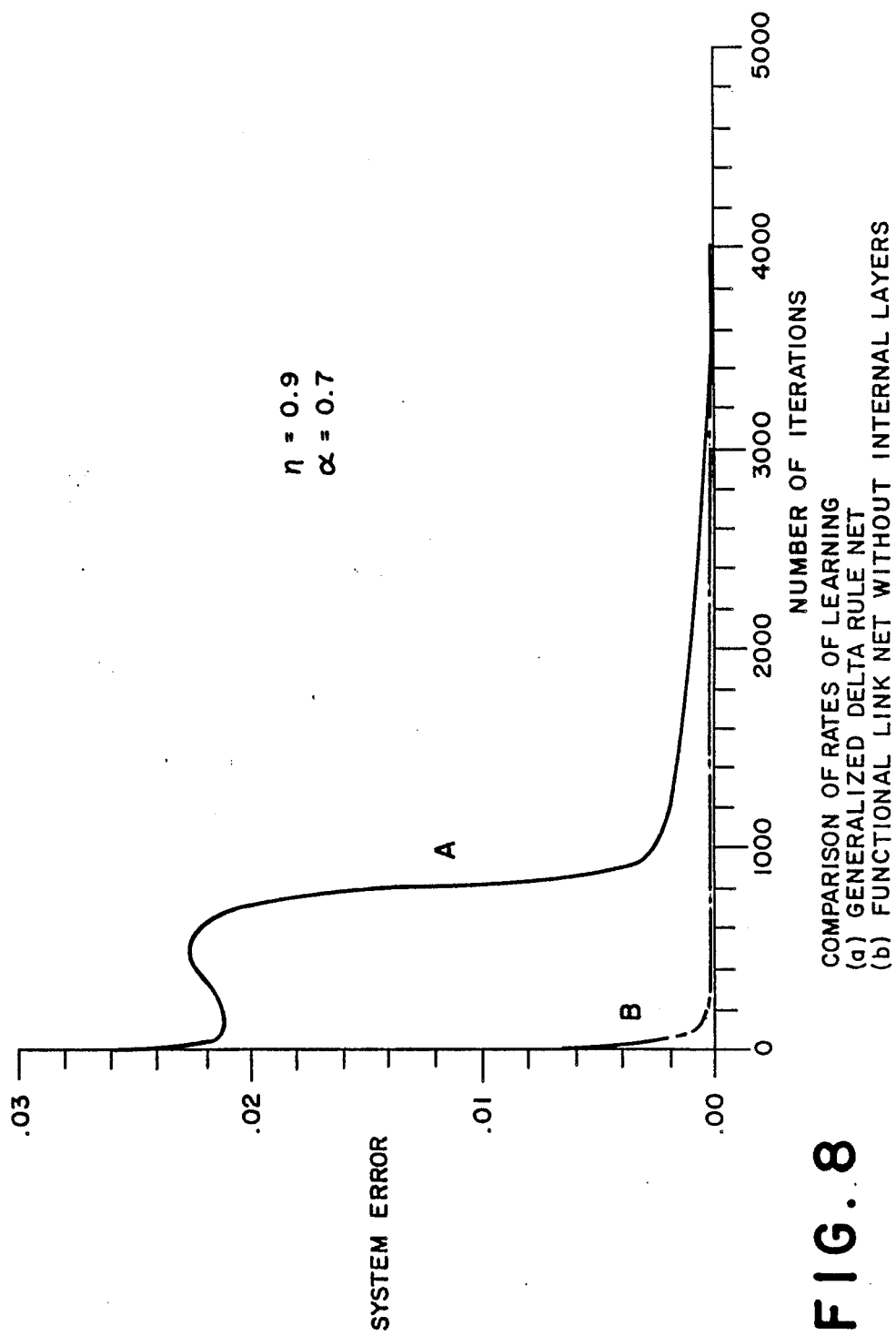

FIG. 8 illustrates a comparison of rates of learning between a generalized delta rule net and a functional link net without internal layers. Interconnections of a generalized delta rule net are illustrated in FIG. 9.

Figure 10:
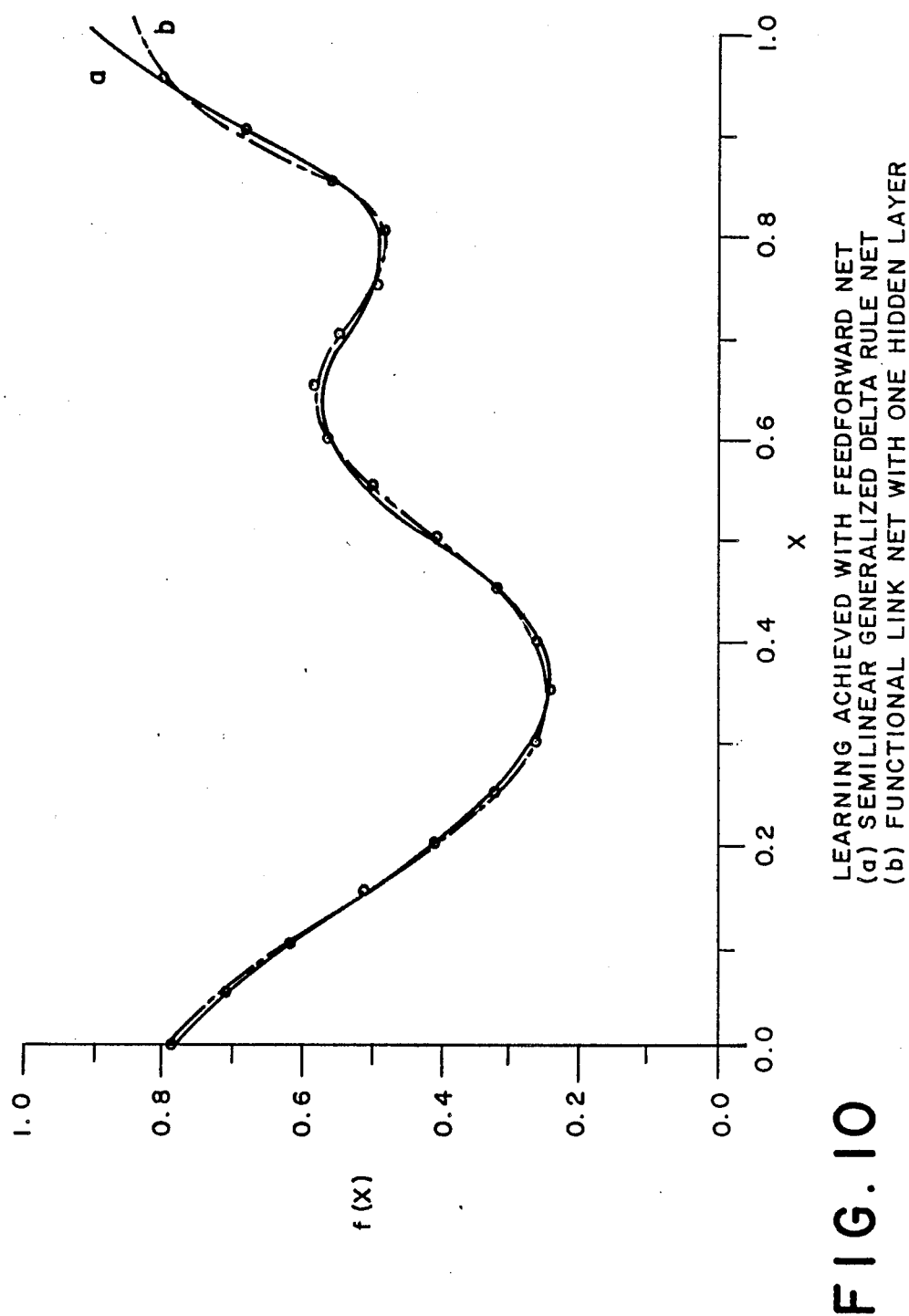
FIG. 10 is a graph of learning achieved with a feed-forward net.

FIG. 10 illustrates learning achieved with a feedforward net. The graphs illustrate both a semi-linear generalized delta rule net and a functional link net with one hidden layer.

Figure 11:
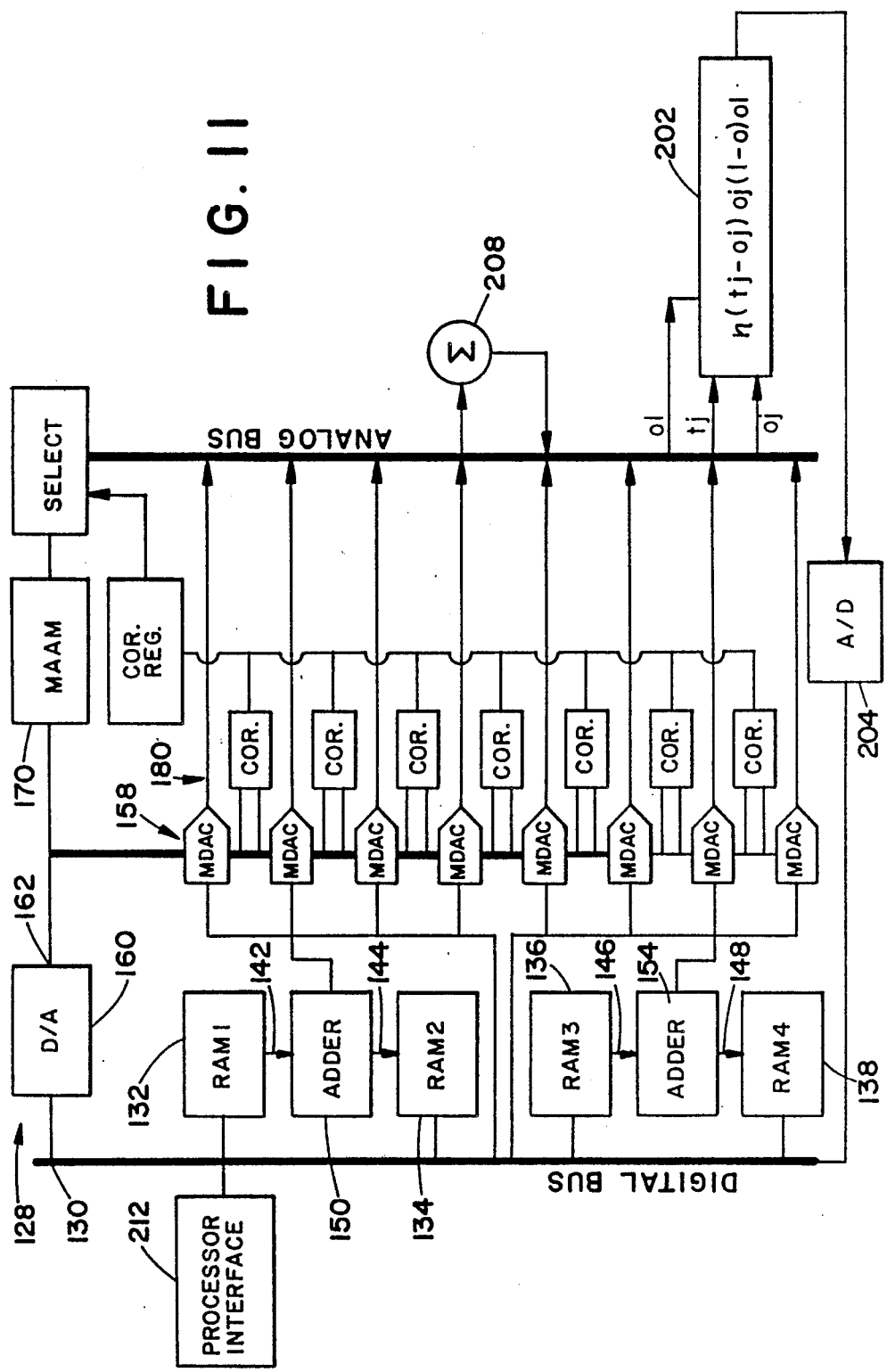
FIG. 11 is a schematic illustrating an improved hardware system for implementation of the subject neural network system.
Figure 12:
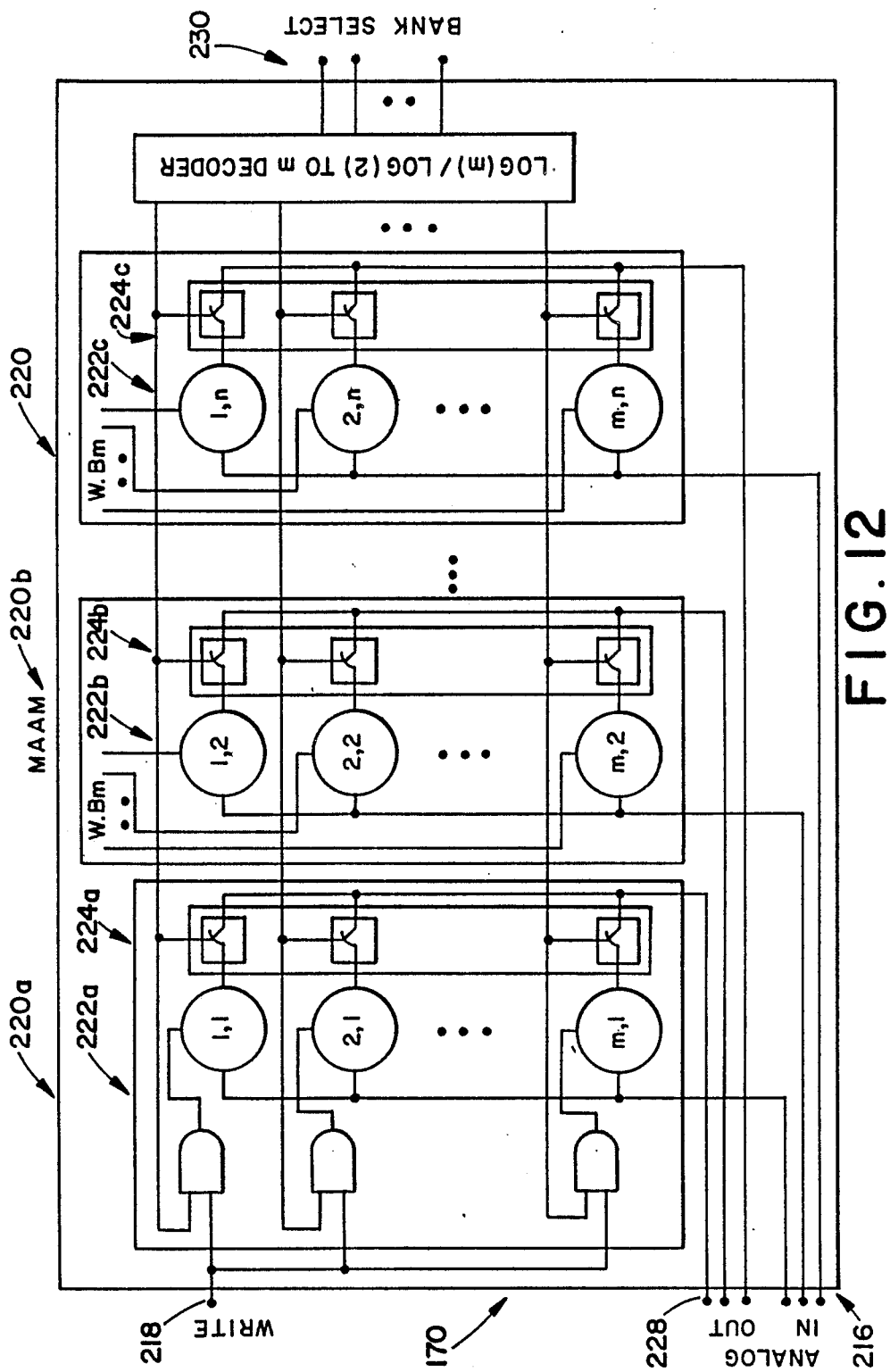
FIG. 12 is a schematic illustrating a multiple access analog memory unit of FIG. 8.

Turning now to FIGS. 11 and 12, an improved hardware system for implementation of the functional link network of the subject application will be described. This architecture implements a hybridized or combined system of digital storage and analog processing. The system is particularly well suited for implementation of an outer product transform of a vector valued input function. The system provides a highly parallel computation unit to speed up outer product calculation, as well as an output calculation and weight adjustments in a training mode.

The architecture implements a digital bus 130 which address memory elements in RAM units 132, 134, 136, and 138. Output 142 outputs a value of a memory cell of an addressed RAM from RAM unit 132, and an output 144 outputs a value from an addressed memory cell of RAM unit 134. Similarly, outputs from addressed cells of RAM 136 form the output 146, as does an addressed memory cell value from RAM 138 form an output 148.

The outputs 142 and 144 form inputs to an adder 150. Similarly, the outputs 146 and 148 form an input to adder 154. A series of multiplying digital to analog converters (MDACs) 158 serve to multiply their respective input values from the adders 150, 154, by an analog signal arrived at from the digital address data on bus 130 by means of a digital to analog convertor 160. The output 162 from the digital to analog convertor 160 also forms the input to a multiple access analog memory (MAAM) 170.

The MDACs actually perform the outer product computation. By use of the analog/parallel arrangement, the outer product computation is rendered extremely fast.

Selected values are then thereby entered into the network and $\Sigma w_{ji}o_j$, which is computed by a hard wired functional block 200, the algorithm of which is the same as that implemented in the generalized delta rule. This output is digitized by an analog to digital convertor 102 and re-entered into the system. Multiple values are accumulated through multiple operations of the MDACs by a summer 208. A final value is made available on the digital bus 130 for outputting from the system. Finally, the entire system is subject to the control of a processor interface 212 to facilitate outside control.

Turning particularly to FIG. 12, the architecture of the multiple access analog memory 170 (FIG. 11) will be described. An analog signal is entered via ANALOG IN lines 216. A WRITE is enabled by implementation of a suitable signal on WRITE line 218. Banks 220a, 220b through 220n, each comprised of a series of sample and hold amplifiers 220a, 220b through 220n respectively, interface with a separate switching element 224a, 224b, through 224n respectively as shown. Individual banks are selected by a digital address 230 which functions as a bank select signal. With the architecture of FIG. 12, an addressable multiple random access analog memory is provided. Finally, an addressed analog output signal is rendered at output lines 228. The above-described circuitry provides an improved apparatus or means for implementation of the non-linear transformation to achieve the improved the neural network results of the subject system.

The invention has been described with reference to the preferred embodiments. Obviously, modifications and alterations will occur to others upon the reading and understanding of the specification. It is our intention that all such modifications and alterations be included, insofar as they come within the scope of the appended claims or the equivalents thereof.

Having thus described our invention, we now claim:

1. A neural network system comprising:
  a plurality of processing nodes arranged into at least first and second layers;
  input means adapted for receiving an input signal comprising data representative of an input pattern;
  first communication means for communicating at least a portion of the input signal to at least a first portion of the processing nodes of the first layer;
  transformation means for performing a non-linear transform on a signal input thereto to form a transformed signal as an output thereof;
  second communication means for communicating at least a portion of the input pattern to the transformation means;
  third communication means for communicating the transformed signal resultant from operation of the transform means to at least a second portion of the processing nodes of the first layer uniquely defined from the processing nodes of the first portion;
  fourth communication means for communicating the output of processing nodes of the first portion and of the second portion of the first layer to at least a first portion of the processing nodes of the second layer; and
  means for outputting the output signal from the processing nodes of the second layer.

2. The neural network of claim 1 wherein the second communication means includes means for communicating all portions of the input signal to the transformation means.

3. The neural network of claim 2 wherein the input pattern data is representative of vector data, and wherein the transformation means includes means for performing vector operations on the input data.

4. The neural network of claim 3 wherein the means for performing vector operations includes means for calculating an outer product of data representative of an input pattern.

5. The neural network of claim 1 further comprising pruning means for selectively pruning outputs of the transform means.

6. The neural network of claim 5 further comprising:
  means for receiving data representative of a training set pattern;
  evaluating means for evaluating joint activations of nodes over a training set pattern; and
  means for controlling the pruning means in accordance with an output of the evaluating means.

7. The neural network of claim 1 wherein each processing node includes:
  means for receiving an analog signal;
  means for storing a digital value representative of a signal weighing value; and
  means for performing an analog processing of a signal communicated thereto in accordance with the signal weighing value.

8. A method of neural processing comprising the steps of:
  receiving an input signal comprising data, representative of an input pattern, into a plurality of processing nodes arranged into at least first and second layers;
  communicating at least a portion of the input signal to at least a first portion of the processing nodes of the first layer;
  communicating at least a second portion of the input signal to a transformation means;
  performing, in the transform means, a non-linear transform on at least the second portion of the input signal to form a transform signal;
  communicating the transform signal to at least a second portion of the processing nodes of the first layer uniquely defined from the processing nodes of the first portion;
  communicating the output of processing nodes of the first portion and the second portion of the first layer to at least a first portion of the processing nodes of the second layer; and
  outputting an output signal from the processing nodes of the second layer.

9. The method of claim 8 further comprising the step of communicating all portions of the input signal to the transformation means.

10. The method of claim 9 wherein the input pattern data is representative of vector data, and further comprising the step of performing vector operations on the input data.

11. The method of claim 10 further comprising the step of calculating an outer product of data representative of an input pattern during the step of performing vector operations on the input data.

12. The method of claim 11 further comprising the step of pruning selected outputs of the transform means.

13. The method of claim 12 further comprising the steps of:
receiving data representative of a training set pattern;
evaluating joint activations of nodes over a training set pattern and;
performing the pruning step in accordance with the evaluating.

14. A neural network system comprising:
a plurality of processing nodes arranged into first and second layers;
input means adapted for receiving an input signal comprising data representative of an input pattern;
first communication means for communicating at least a portion of the input signal to a first subset of the processing nodes of the first layer;
transformation means for performing a non-linear transform on a signal input thereto to form a transformed signal as an output thereof;
second communication means for communicating at least a portion of the input pattern to the transformation means;
third communication means for communicating the transformed signal resultant from operation of the transform means to at least a second subset of the processing nodes of the first layer, the second subset being uniquely defined from processing nodes of the first subset;
fourth communication means for selectively communicating the output of processing nodes of the first subset and of the second subset of the first layer to selected processing nodes of the second layer; and
means for outputting the output signal from the processing nodes of the second layer.

15. The neural network of claim 14 wherein each processing node includes:
means for receiving an analog signal;
means for storing a digital value representative of a signal weighing value; and
means for performing an analog processing of a signal communicated thereto in accordance with the signal weighing value.

* * * * *